United States Patent

[11] 3,573,589

| [72] | Inventor | Jack Berry |
| | | Farmington, Mich. |
| [21] | Appl. No. | 812,006 |
| [22] | Filed | Apr. 1, 1969 |
| [45] | Patented | Apr. 6, 1971 |
| [73] | Assignee | Burroughs Corporation |
| | | Detroit, Mich. |

[54] POSITION SERVO SYSTEM FOR A MOTOR INCLUDING DETENTING AT DESTINATION
6 Claims, 12 Drawing Figs.

[52] U.S. Cl. .................................................. 318/601,
318/685, 318/602, 318/640
[51] Int. Cl. ..................................................... G05b 19/28
[50] Field of Search ............................................ 318/20.746,
20.300, 20.310, 20.315, 138, 254, 138 (A), 640,
685, 696

[56] References Cited
UNITED STATES PATENTS

| 2,827,602 | 3/1958 | Horsfall ....................... | 318/(20.746) |
| 2,864,044 | 12/1958 | Pardee ......................... | 318/(20.746) |
| 2,989,680 | 6/1961 | Weiser et al. ................. | 318/(20.310) |
| 3,374,410 | 3/1968 | Cronquist et al. ............ | 318/138 |
| 3,385,984 | 5/1968 | O'Regan ...................... | 318/138X |
| 3,465,217 | 9/1969 | Kress ............................ | 318/(20.320) |
| 3,466,520 | 9/1969 | Aylikci et al. ................ | 318/254X |

*Primary Examiner*—G. R. Simmons
*Attorneys*—Paul W. Fish and Edwin W. Uren

ABSTRACT: The disclosure embodies a servo system to position a rotatable print wheel with any one of a number of selectable printing type at a print line. The system includes a reversible electric step motor having a number of pulsable induction coils to rotate the print wheel. Selections of print wheel positions are effected by signals from keyboard actuated switches and the position selected is indicated by a position indicator which is driven by the step motor synchronously with the print wheel. A comparator receives and compares the signals from the keyboard actuated switches with signals from the position indicator to determine the angular displacement between the selected position and present position of the print wheel. Through digital logic systems including a pulse generator and a direction selection means, the number of pulses supplied to the motor to position the print wheel is effected along with the rotational driving of the wheel in the direction requiring least angular displacement of the wheel to reach the selected position. During the positioning of the print wheel, a control member responds to a match between the keyboard selected position and the position indicator to dynamically brake the step motor by simultaneously energizing all of the induction coils.

Patented April 6, 1971 3,573,589

| COUNTERCLOCKWISE ROTATION CCW | | |
|---|---|---|
| DAFF | DBFF | COIL |
| 1 | 1 | 35 |
| 0 | 1 | 41 |
| 1 | 0 | 37 |
| 1 | 1 | 35 |

FIG.11.

| CLOCKWISE ROTATION CW | | |
|---|---|---|
| DAFF | DBFF | COIL |
| 1 | 1 | 35 |
| 1 | 0 | 37 |
| 0 | 0 | 41 |
| 1 | 1 | 35 |

INVENTOR.
JACK BEERY.

BY
Russel C. Wells
ATTORNEY.

Patented April 6, 1971

POSITION SERVO SYSTEM FOR A MOTOR INCLUDING DETENTING AT DESTINATION

SUMMARY OF THE INVENTION

A digital servocontrol system for positioning the rotor of a bidirectional stepping motor to a selected position. The invention resides in the provision of a comparator for comparing the previous selected position and a newly selected position to determine the minimum angular displacement between said positions. A pulse generator supplied a plurality of pulses individually to stepping motor coils to rotate the print wheel toward the newly selected position. A control member is responsive to the newly selected position to energize the nonenergized coils thereby stopping rotation of the print wheel and holding the print wheel at the newly selected position.

DETAILED DESCRIPTION

Figure 1:
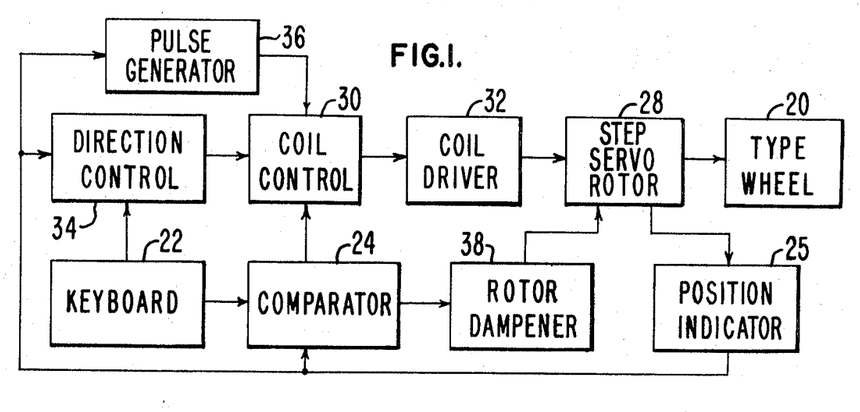
FIG. 1 is a block diagrammatic illustration of the system embodying the present invention.

Referring to FIG. 1, there is illustrated in block diagrammatic form a servomotor control system including a rotatable member or a print wheel 20. The servomotor control system includes information indexing means, such as a keyboard 22 to receive information for selecting the next position of the print wheel 20. The selected position is compared by a comparator 24 with the previously selected position, as indicated by a position indicator 25 in synchronism with the print wheel 20. The signal output of the comparator 24 representing the angular displacement between the present and previously selected positions, is electrically gated to a coil control unit 30 controlling the energizing of coil drivers 32 for rotating a stepping servomotor rotor 28.

The signals from the position indicator 25 and the keyboard 22 are also compared in a direction control unit 34 to determine the direction of rotation of the rotor 28 so that the print wheel 20 rotates through the smallest angular displacement to reach a newly selected position. Therefore, the maximum angular rotation of the print wheel 20 between any two selectable positions is 180°.

Figure 5:
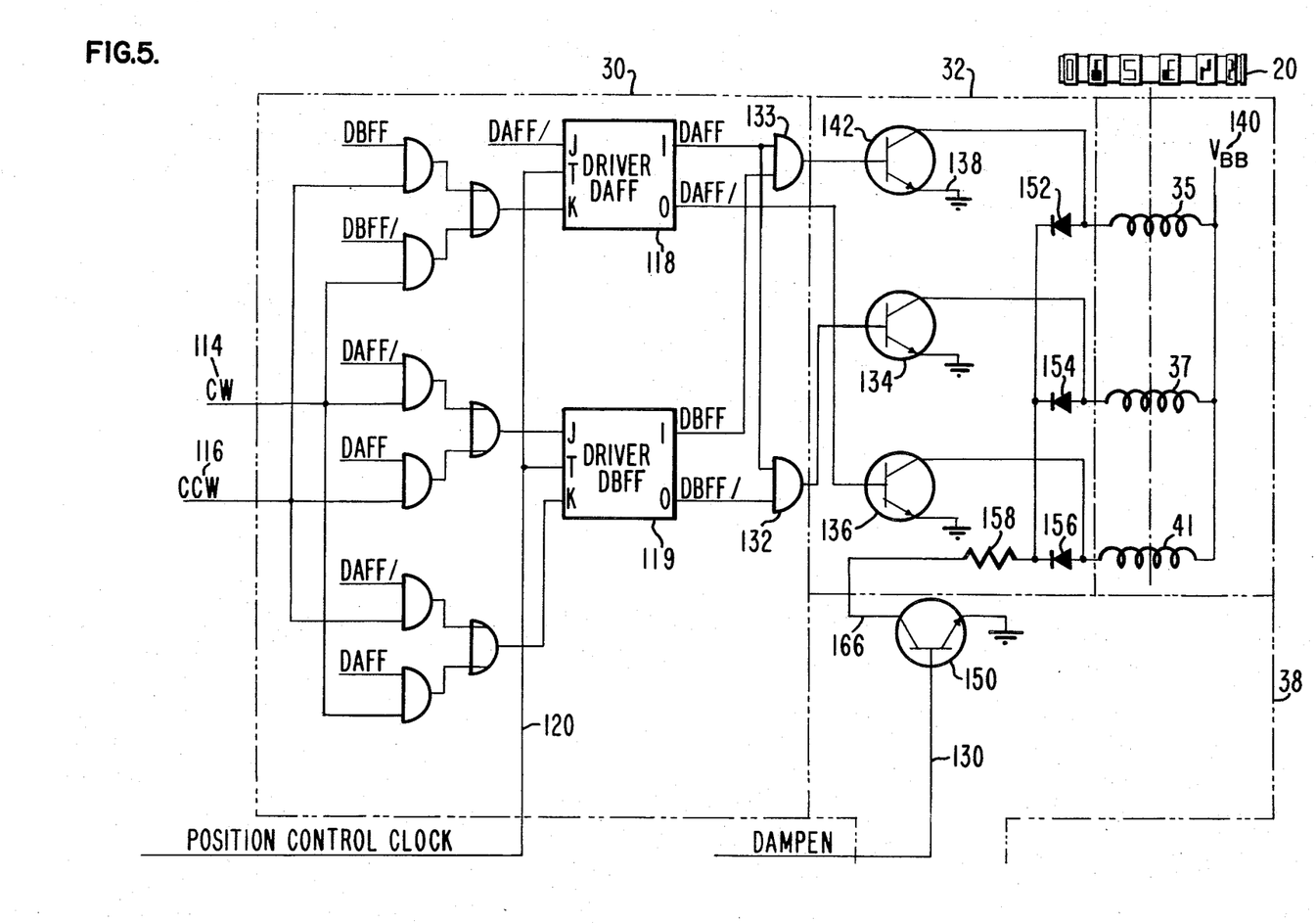
Figure 10:
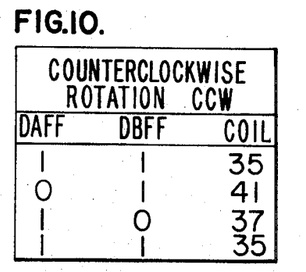
FIG. 10 is a table illustrating the counterclockwise rotational sequence of the rotor of FIG. 1.
Figure 11:
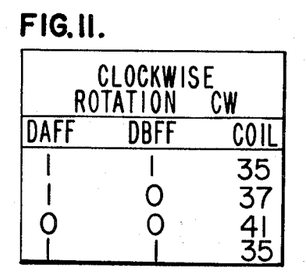
FIG. 11 is a table illustrating the clockwise rotational sequence of the rotor of FIG. 1.

After determination of both rotational direction and angular displacement, a pulse generator 36 generates a plurality of electrical pulses, hereinafter called position control clock pulses, sufficient to cause the rotor 28 to rotate to the selected position. As illustrated in FIGS. 1 and 5, the position control clock pulses are supplied to the coil control unit 30 to consecutively energize the induction coils 35, 37 and 41 for rotating the rotor 28. The order of energization of the coils 35, 37 and 41 as illustrated in FIGS. 10 and 11, is controlled by the direction control unit 34 thereby permitting bidirectional rotation of the rotor 28.

When the print wheel 20 is positioned with a selected type at the selected position, as determined by the comparator 24, an electrical signal is applied to a rotor dampener control 38 to stop rotation of the rotor 28 and by cooperating with the coil driver unit 32 assist in holding the print wheel 20 against oscillation and thereby eliminating inaccuracy in type spacing.

Figures 8, 12:
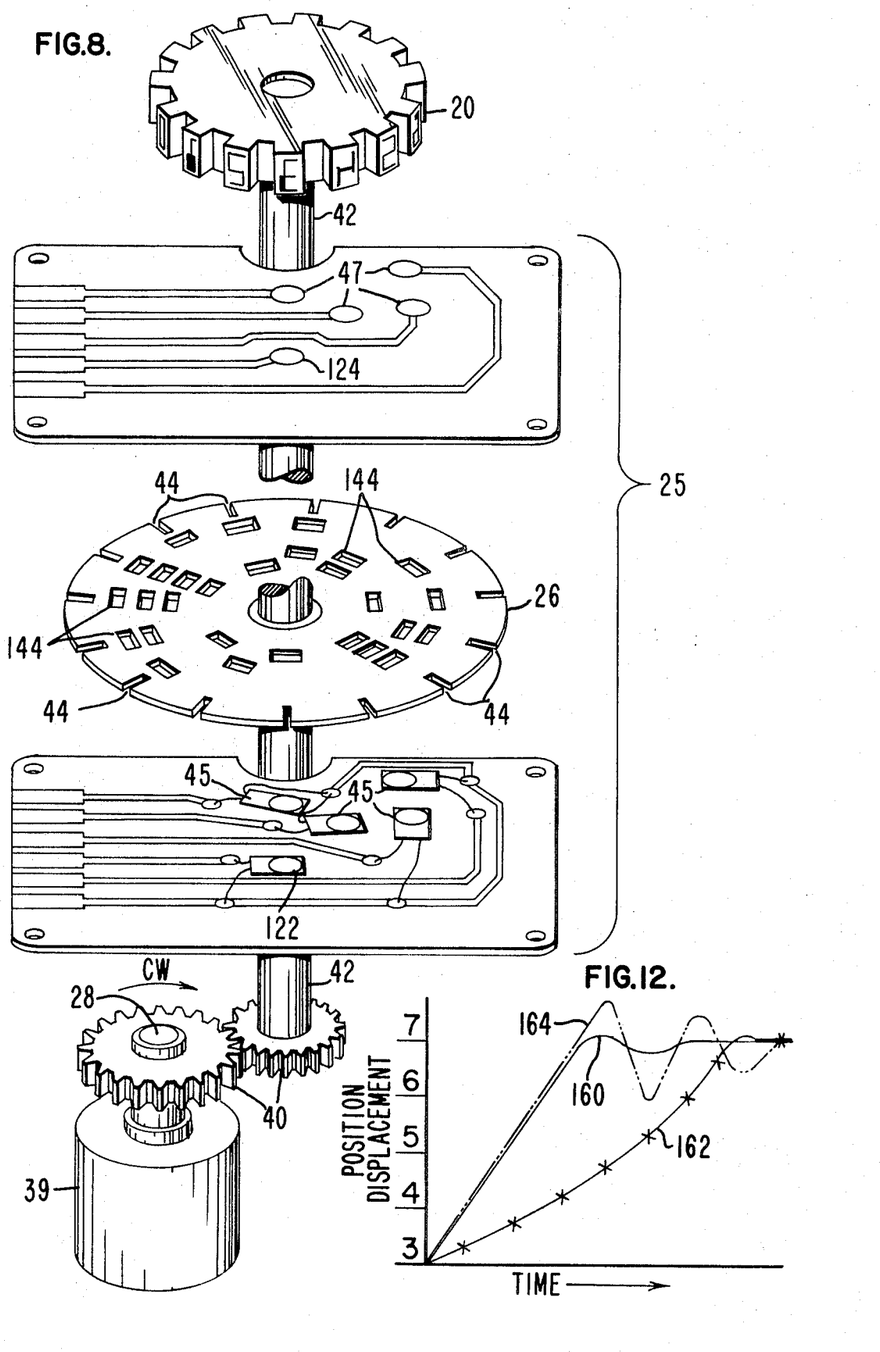
FIG. 8 is a perspective drawing illustrating several of the elements of FIG. 1.
FIG. 12 is a graph of displacement and time of the system of FIG. 1.

Referring to FIG. 8 there is illustrated a perspective exploded view of several of the components of the system of FIG. 1, including the stepping motor 39. The rotor 28 of the motor 39 is connected by reduction gears 40 to a driven shaft 42 onto which the print wheel 20 is affixed. The print wheel 20, as shown, has fifteen print positions although the number of positions may vary. Spaced along the driven shaft 42 and aligned with the print wheel 20 is a disc 26 having a plurality of coded positions. Each coded position represents a printing position on the print wheel 20. The outermost circumferential tract of the disc 26 comprising a plurality of equally angularly spaced slots 44, which control the pulse generator 36 to generate a pulse at each print position. Positioned in spaced relationship to and on one side of the disc 26 there is a plurality of solar cells 45 each representing a portion of the codal representation of each printing position. Shown are four cells 45 which represent the binary values of one, two, four and eight and also one cell 122 for the pulse generator tract. Positioned in spaced relationship on the opposite side of the disc 26 and in alignment with the solar cells are a plurality of cell excitors or lamps 47 and 124. As shown in FIG. 8, there is one excitor for each solar cell.

OPERATION

Figures 2, 3:
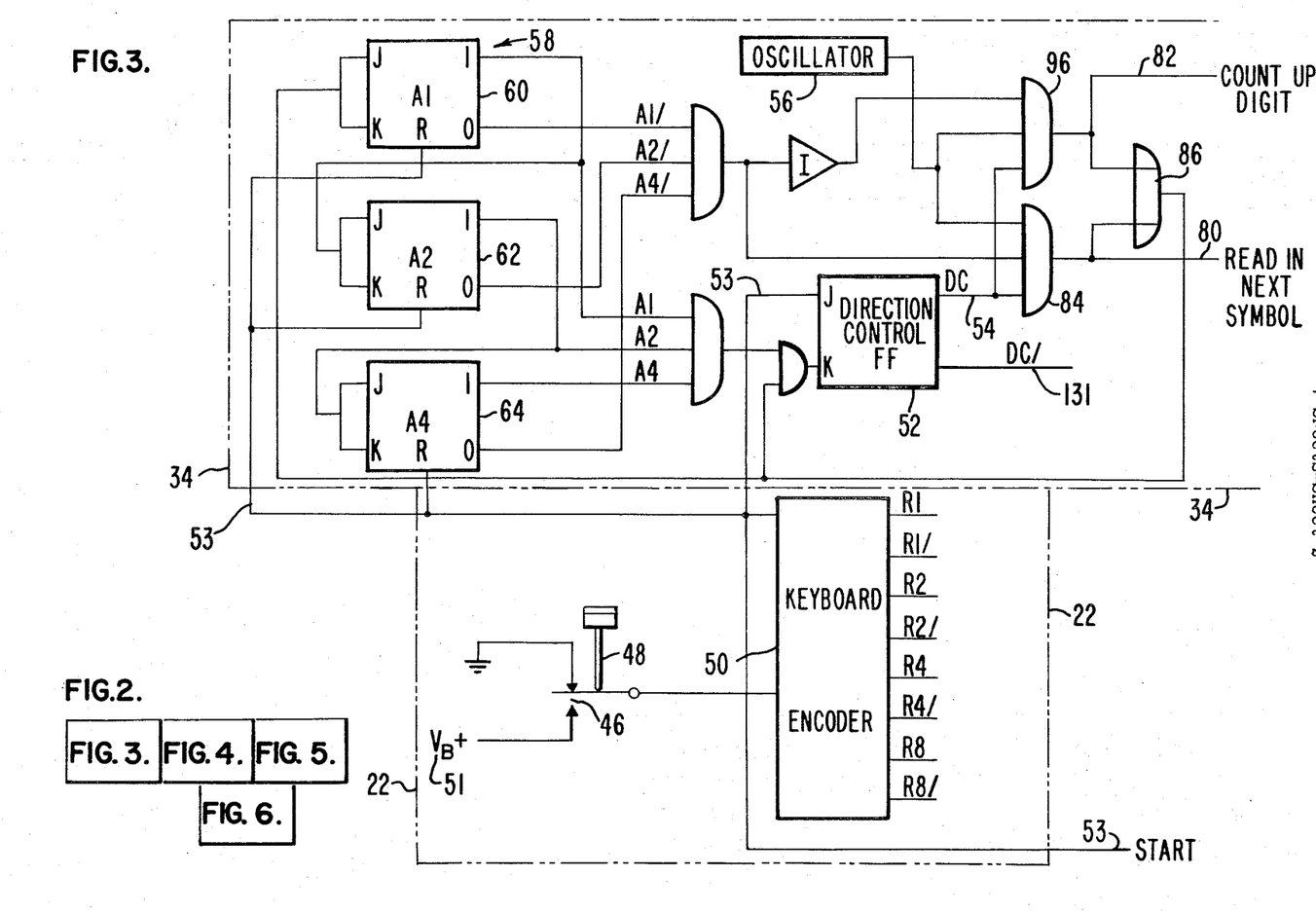
FIG. 2 is a block diagram illustrating the relationship between FIGS. 3, 4, 5 and 6.
FIG. 3, 4, 5, and 6 are schematic diagrams of the system of FIG. 1.

The operation of the servocontrol system can best be described by reference to FIGS. 2 through and including FIG. 7. The block diagram of FIG. 2 shows the relationship between the several sections of the schematic of FIGS. 3, 4, 5 and 6. The timing chart of FIG. 7 will be referred to for correlation of the several signals derived in the logic elements shown in FIGS. 3 through 6.

In the schematic of FIGS. 3, 4, 5 and 6, all of the flip-flops shown are J—K-type flip-flops. The flip-flops are negative triggering and where the trigger or T input is used, the flip-flop is controlled by a pulse on the trigger line. All of the logic gates are positive AND or OR gates. Thus, for an output signal from an AND gate to be true, all of the input signals must be true and likewise, for the output signal from an OR gate to be true, at least one input signal must be true. Also shown in FIGS. 3, 4, 5 and 6 are pulse standardizers, labeled PS, which are positive triggered devices and generate a single discrete pulse for each triggered input. In the preferred embodiment, the voltage level for a "true" signal is +5 v. and the voltage level for a "false" signal is ground.

Referring to FIG. 3, the keyboard unit 22 is schematically illustrated by a keyboard encoder 50 and a switch 46 which is actuated from a key 48. The key 48 may represent any one of information keys normally associated with a keyboard such as found on accounting machinery. By way of illustration of the operation of the preferred embodiment of the system, the key 48 will represent the decimal value of "seven" which will be hereinafter referred to as the selected position and the previously selected or present position of the print wheel 20 is "three." The switch 46 represents the several switch members which are actuated by the depression of the key 48 to initiate the operation of the system.

One of the functions of the switch 46 is to complete an electrical circuit between a source of voltage 51 and the keyboard encoder 50 for electrically transferring the value of the key 48 to the encoder 50. Since, as stated, the key 48 represents the decimal value of "seven" the logical "true" outputs of the encoder 50 will be R1, R2, R4 and R8/.

Another function of the encoder 50 is to generate an electrical signal to initially condition the system. This signal 53, which is a pulse and is hereinafter called "start," electrically conditions the several logical elements of the system. In FIG. 3, the signal is supplied to the J input of the direction control flip-flop 52 in the direction control unit 34 causing the flip-flop 52 to switch to its binary 1 or DC signal level output 54. The "start" signal is also supplied to the reset inputs of the three flip-flops 60, 62 and 64 comprising the A counter 58 in FIG. 3 and to the four flip-flops 68, 70, 72 and 74, comprising the B counter 66 shown in FIG. 4, causing these flip-flops to switch to their binary 0 outputs.

As hereinbefore stated, the function of the direction control unit 34 is to determine the direction of rotation of the rotor 28 which will result in the smallest angular displacement between the selected position and the present position. This is accomplished by first selecting a normal direction of rotation of the rotor which in the preferred embodiment is counterclockwise. Then with the use of a high speed counter 66 which has been preset to the binary value of the selected position, a count is generated which is equal to the binary value of selected position plus the binary value of an integer equal to one-half the number of rotational positions of the rotor. During each increase in the counter 66, the binary output value of the counter is compared to the binary value of the present position of the rotor as indicated by the position indicator 25, and if a match occurs, the normal direction of rotor rotation is incorrect.

Figure 4:
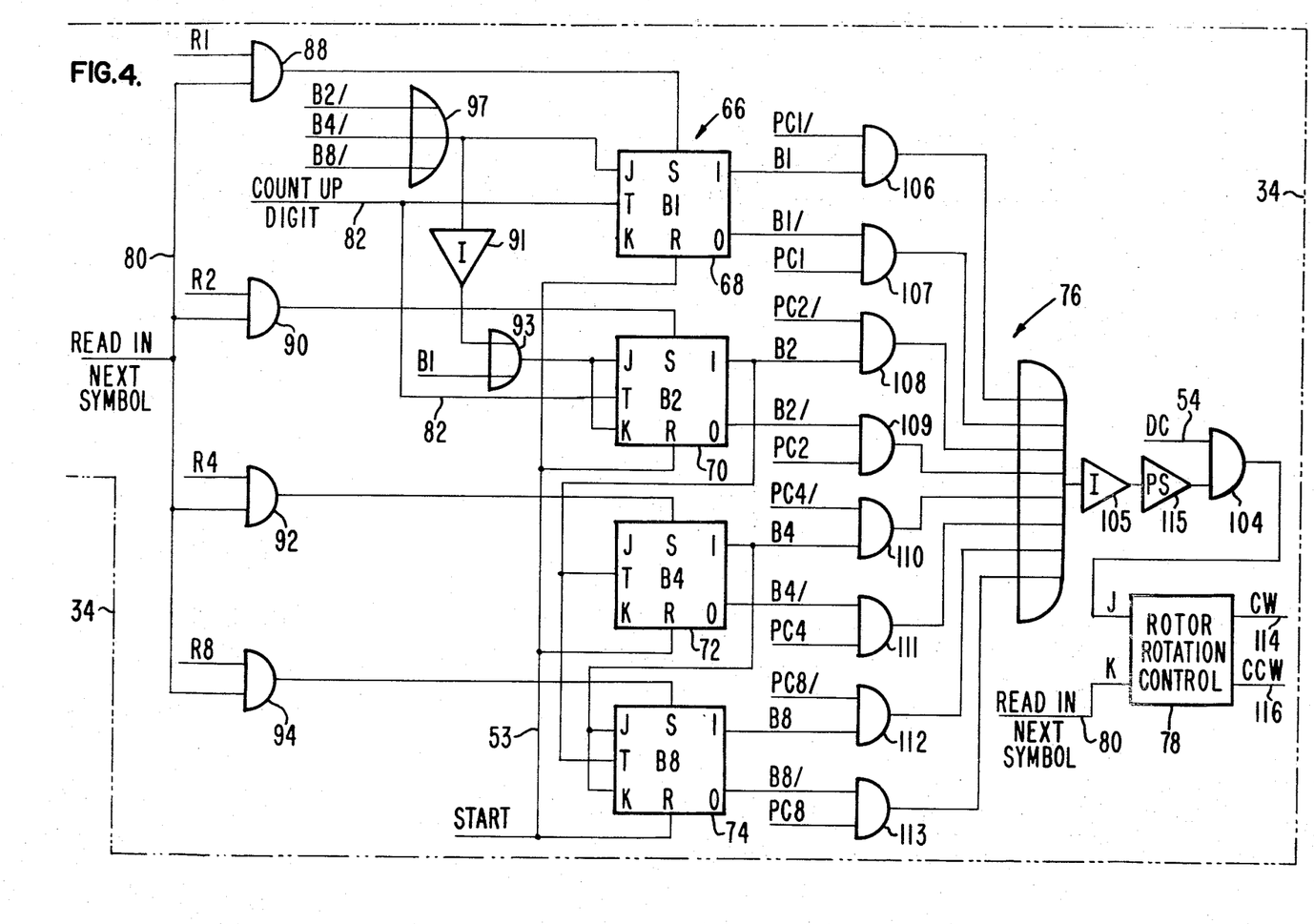

In the preferred embodiment, as shown in FIGS. 3 and 4, the direction control unit 34 comprises an oscillator 56, a 3-stage counter 58, the A counter, comprising flip-flops 60, 62 and 64, a high speed 4-stage counter 66, the B counter, comprising flip-flops 68, 70, 72 and 74, and a comparator 76. The output of the comparator controls the rotor rotation control flip-flops 78.

Within the direction control unit 34, several signals are generated to select the rotational direction of the rotor. The selected position number, which for the purpose of illustration is seven, is preset into the B counter 66 by the "Read in next symbol" signal 80, hereinafter referred to as RINS. This signal is defined by the following equation:

RINS → Oscillator $\cdot DC \cdot A1/ \cdot A2/ \cdot A4/$ wherein:
Oscillator represents the pulse output from the oscillator 56;
DC is the binary 1 output 54 of the direction control flip-flop 52; and
$A1/, A2/, A4/$ are the binary 0 outputs from each of the three stages of the A counter 58 representing a zero count.

The B counter 66 is incremented by the signal "count up digit" 82, hereinafter referred to as CUD, which is defined by the following equation:

CUD → Oscillator $\cdot DC \cdot (A1+A2+A)$

From the above equation, namely, the term $(A1+A2+A)$, CUD 82 is a signal comprising seven oscillator pulses or the equivalent of the integer equal to one-half the number of rotation positions of the rotor 28 in the preferred embodiment. In like manner, RINS 80 is a signal comprising one oscillator pulse.

Figure 6:
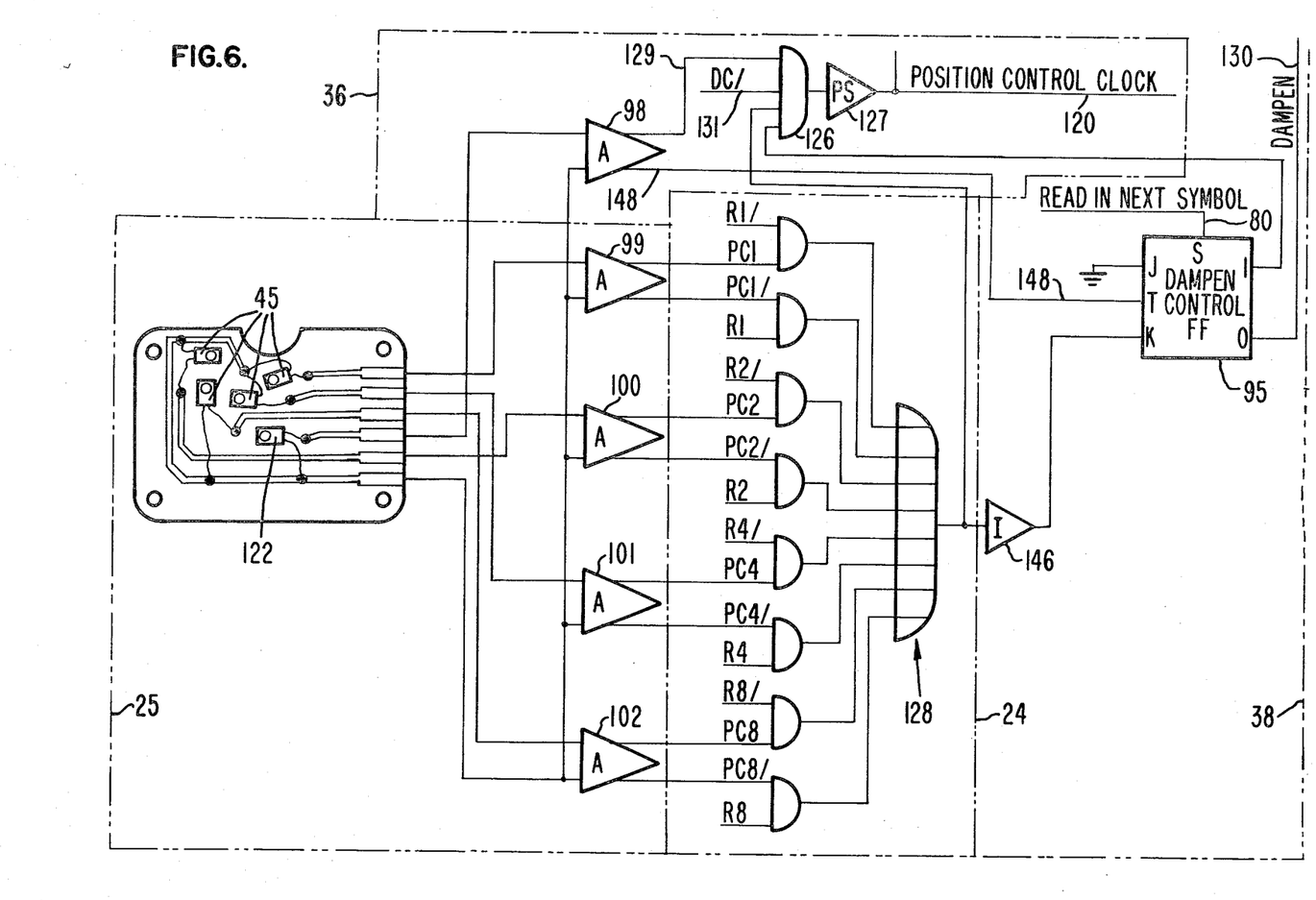

The oscillator 56, shown in FIG. 3 and indicated in the above equation, may be any known type of oscillator which in the preferred embodiment has a pulse repetition rate of 6 microseconds. Therefore, within 6 microseconds after the direction control flip-flop 52 is switched, RINS 80 is generated in the AND gate 84. RINS 80 is supplied to one input of the OR gate 86 to count the A counter 58 and is also supplied to the gating circuits of the B counter 66 setting the binary value of the selected position into the B counter 66. These gating circuits are represented in FIG. 4 by the four two-input AND gates 88, 90, 92 and 94 individually connected to the dominant set input of each of the counter flip-flops 68, 70, 72 and 74. Also in FIG. 4, RINS 80 is supplied to the K input of the rotor rotation control flip-flop 78 resetting this flip-flop to the binary 0 output indicating counterclockwise, CCW 116, rotation of the rotor 28. This is the normal rotational direction of the rotor 28 and will be changed if the selected position is within seven positions from the present position as determined by the comparator 76. In FIG. 6, RINS is supplied to the dominant set input of the dampen control flip-flop 95 to remove the dampen signal 130 from the rotor coils 35, 37 and 41. RINS is not contained in the CUD signal because one input representing the A counter 58 to the AND gate 96 is the negation of the A counter signal in the AND gate 84.

The output of the OR gate 86 increments the A counter 58 and in the preferred embodiment comprises eight oscillator pulses. On the eighth pulse, the direction control flip-flop 52 and the A counter 58 are both reset.

FIG. 4 is the schematic illustrating the implementation of the B counter 66 and the comparator circuit 76 to determine the direction of rotation of the rotor 28. The B counter 66 is a modified counter which counts according to the table below. The modification is accomplished by the inverter 91 cooperating with the two OR gates 93 and 97.

| Count: | "B" Counter (selected position) | | | |
| --- | --- | --- | --- | --- |
|  | B8 | B4 | B2 | B1 |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |
| 11 | 1 | 0 | 1 | 1 |
| 12 | 1 | 1 | 0 | 0 |
| 13 | 1 | 1 | 0 | 1 |
| 14 | 1 | 1 | 1 | 0 |
| 0 | 0 | 0 | 0 | 0 |

Referring to FIG. 8, the rotor 28 is geared to the shaft supporting the print wheel 20, and, therefore, clockwise rotation of rotor 28 results in counterclockwise rotation of the print wheel 20.

Figure 9:
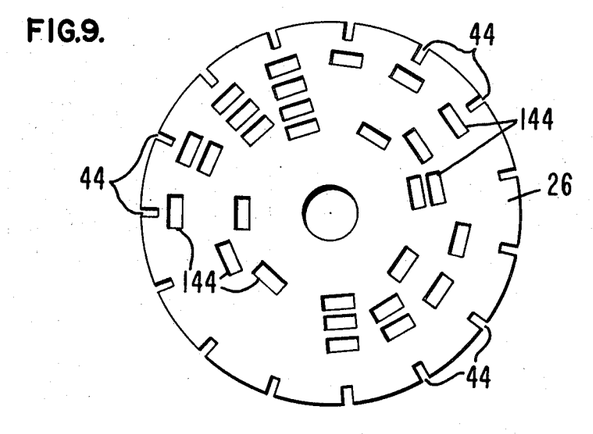
FIG. 9 is a plan view of one of the elements of FIG. 8.

As previously stated, the selected position, which is seven, is preset in the B counter 66 via the three AND gates 88, 90 and 92. The present position which is three, is determined from the disc 26 illustrated in FIG. 9. The present position is "read out" of the disc 26 by a solar cell system comprising an exciter 47 and solar cell 45 for each binary bit position. This is schematically shown in FIG. 6 where the electrical outputs from the solar cells 45 are electrically connected to a plurality of amplifiers 99 through and including 102. Each amplifier 99, 100, 101, 102 and also the amplifier 98 which is electrically connected to solar cell 122, has two outputs which are complementary to each other with only one output logically true at any given print wheel position. All eight outputs PC1, PC1/, PC2, PC2/, PC4, PC4/, PC8 and PC8/ are gated in the AND gates 106 through and including 113 with the eight outputs of the B counter 66 in the comparator 76. The comparator output is logically inverted by inverter 105 and electrically connected to a pulse standardizer 115 and through an AND gate 104 to the J input of the rotor rotation control flip-flop 78. The second input to the AND gate 104 is the binary 1 output, DC 54, from direction control flip-flop 52, to control the operation of the rotor rotation control flip-flop 78.

The output of the comparator 76 is logically true whenever any of the eight AND gates 106 through and including 113, have both input signals true. The inverter 105 changes the comparator output to a logically false signal which will not trigger the pulse standardizer 115. Whenever during the seven pulses which comprise the count up digit signal 80, all of the AND gates 106 through 113 gates are logically false, the inverter output becomes true and the pulse standardizer 115 generates a pulse output. The rotor rotation control flip-flop 78 is set and the rotation of the rotor 28 is changed from counterclockwise (CCW) to clockwise(CW).

The rotor rotation control flip-flop signals CW 114 and CCW 116, control the gating logic to the coil driver flip-flops, DAFF 118 and DBFF 119 as shown in FIG. 5. The logical sequence of these two flip-flops 118 and 119 control the sequence of energizing of the induction coils 35, 37 and 41 which are arranged around the axis of the rotor 28. FIGS. 10 and 11 show in tabular form the sequence of each flip-flop 118 and 119 causing the rotor 28 to rotate either counterclockwise in FIG. 10 or clockwise in FIG. 11.

Figure 7:
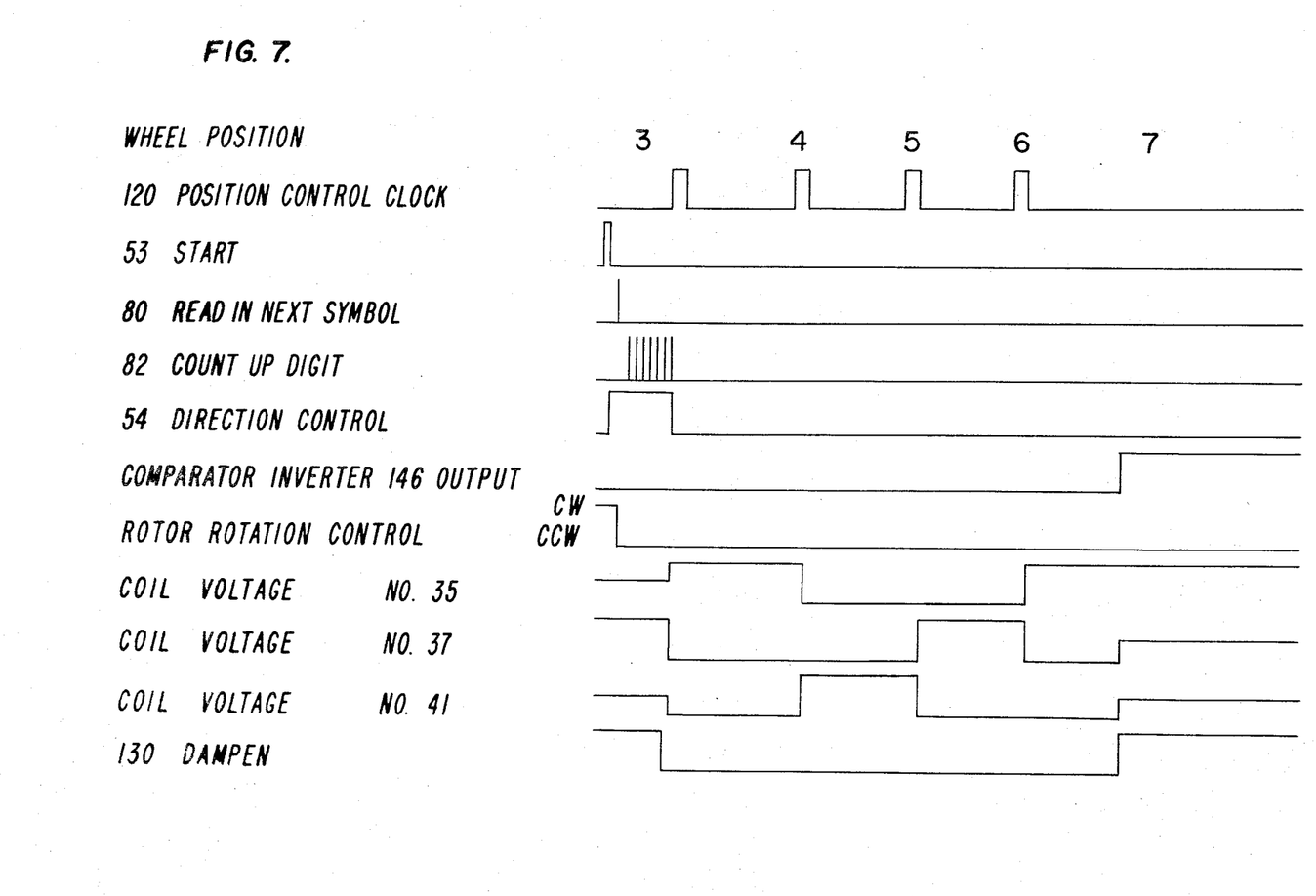
FIG. 7 is a timing diagram of the system for FIG. 1.

Referring to timing chart of FIG. 7, during the above operation, the print wheel 20 is still in position 3. At the end of the count up digit signal 82 the direction control flip-flop 52 is reset. Depending upon state of the rotor rotation control flip-flop 78, the induction coil adjacent to position 3 will be energized. Since by example the rotor 28 is to be rotated counterclockwise and induction coil 37 is energized with the print wheel 20 in position 3, the adjacent induction coil 35 will be energized to rotate the print wheel 20.

The position control clock 120, PCC, is generated from the pulse generator 36 comprising a plurality of rim slots 44 along the circumference of the disc 26 which are "read" by a solar cell system comprising an exciter lamp 124, a solar cell 122 and an amplifier 98. The first output 129 of the amplifier 98 is gated in an AND gate 126 to trigger the pulse standardizer 127 forming the logic signal PCC 120. The conditions necessary for generating PCC 120 are the presence of a rim slot 44 between the solar cell 122 and the exciter lamp 124 driving the first output 129 of the amplifier 98 true; a condition of no match between the selected position represented by R1, R2, R4 and R8 and the present position represented by PC1, PC2, PC4 and PC8 of the print wheel as determined by the eight AND gates in the comparator 128; the binary 0 output, DC/ 131, of the direction control flip-flop 52; and the binary 1 output of the dampen control flip-flop 95. In the present illustration, PCC sets the coil driver DBFF 119 according to the following equation:

$$DBFF = DAFF \cdot CCW \cdot PCC$$

The output of the AND gate 132 controlling the coil driver transistor 134 becomes false and the output of the AND gate 133 becomes true driving the coil driver transistor 142 into conduction to energize coil 35. Since the emitter 138 of the coil driver transistor 142 is grounded, the full value of the voltage $V_{BB}$ 140 appears across the induction coil 35. This switching action of the flip-flop DBFF 119, will prevent the other two coil driver transistors 134 and 136 from being driven into conduction.

The rotor 28 rotates in a counterclockwise direction through print wheel position 4, 5 and 6 because no match is found between the selected position as indicated by R1, R2, R4 and R8/ and each print position as indicated by the position indicator 25 in the comparator 128 in FIG. 6. As shown in FIG. 7, the only changing signals are the voltage across the coils 35, 37 and 41, due to the switching of DAFF 118 and DBFF 119 according to the table of FIG. 10.

After leaving position 6, the next position being the desired position must be identified as such before the coil 37 is energized. To accomplish this, the relation between the rim slots in the disc 26 and the read out windows 144 of the binary value of the print position must be maintained. It is necessary for the slot 44 to be wholly within the area of the read out window 144 of a given print position. Since this is a bidirectional system, the rim slot 44 for each print position lies along the radial centerlines of read out windows 144. The width of the rim slot 44 is approximately one-half of the width of the read out windows 144 thus permitting the position solar cells 45 to be "read" before the rim solar cell 122 is "read."

When the match between the present position and the selected position occurs in the comparator 128, output of AND gate 126 goes false, to prevent further switching DAFF 118 and DBFF 119. The output of the comparator 128 is inverted by the inverter 146 and supplied to the K input of the dampen control flip-flop 95. The output signal from the second output 148 of pulse generator amplifier 98 switches the dampen control flip-flop 95 to activate a dampening control circuit comprising a control transistor 150, a rectifier 152, 154, 156 for each winding and a current limiting resistor 158.

The dampening control response 160 of the present system is graphically compared in FIG. 12 with systems having either an overdamped response 162 or an underdamped response 164. Curve 162 shows the sluggish, time consuming response of an overdamped system. Curve 164 shows the fast response with overshoot of a high gain or an underdamped system. The inertia present in a high gain system causes an oscillatory motion of the print wheel during the damping action which is undesirable. During this oscillatory period the print wheel is not available for printing. The dampening system for the present system has the response of the curve 160 which shows the quick underdamped response of the present system until the selected position is reached when the system then functions as an overdamped system preventing oscillation of the rotor 28 and the print wheel 20. The velocity of the rotor 28 of the present system is substantially the same as the high gain, underdamped system, but has no oscillatory motion when the selected position is reached.

When the present position of the rotor matches the selected position, the output of the comparator 128 resets the dampen control flip-flop 95 causing the dampening transistor 150 to conduct. A current path from the voltage supply 140 is completed through the respective rectifiers 154 and 156 of coils 37 and 41 through the current limiting resistor 158 to the collector 166 of the dampening transistor 150 to ground. The coil driver 142 controlling the coil 35 when the last position control clock pulse was emitted continues to conduct, the rotor will rotate until the exact center of the fully energized coil winding 35 is reached. The full voltage is applied across the one coil 35 at the exact position of the selected position and the other coils 37 and 41 have a reduced voltage across them. No further rotation is allowed because each of the coils 37 and 41 adjacent to coil 35 develop a torque attempting to rotate the rotor 28 in both a clockwise and counterclockwise direction at the same time. Therefore, substantially the full velocity of the rotor can be utilized to rotate the pring wheel 20 because there is no lost time in switching from the drive control to the dampening control circuit.

It is readily apparent from the schematics that if the selected position and the present position are initially the same, the dampening control circuit is not activated and the rotor 28 would not rotate. Also to one skilled in the art, a time delay unit could be applied to the dampening control flip-flop 95 to initialize the flip-flop after the rotor 28 has been stopped for a sufficient period of time.

I claim:

1. A servocontrol system for selectively positioning a print member said system comprising:

a magnetic rotor operatively connected to the print member;

a plurality of separately energizable induction coils arranged about the axis of said rotor, said coils consecutively energized to rotate said rotor;

a plurality of control members electrically connected to each of said coils respectively controlling the energizing thereof;

position indicator means operatively connected to said rotor to indicate the present position of said rotor, and the print member;

indexing means to electrically select another position of the print member;

comparator means operatively connected to said position indicator means and said indexing means to determine both the direction of rotation of said rotor and the amount of angular displacement of said rotor;

pulse generating means responsive to said comparator means and operative to supply the correct number of pulses to said control members to effect the desired angular displacement of said rotor; and electrical dampening control means responsive to said comparator and operable to apply a voltage to each nonenergized induction coil at the selected position of the print member to stop rotation of said rotor and hold said rotor in the selected position.

2. The servocontrol system according to claim 1 wherein the electrical dampening control means selectively and electrically connects to each inductive coil adjacent to the presently energized inductive coil at said selected position a voltage to stop the rotation of said rotor and to hold the said rotor in said selected position.

3. The servocontrol system according to claim 2 wherein said electrical dampening control means applies a reduced dampening voltage to said adjacent induction coils, when said rotor is in said selected position.

4. The servocontrol system according to claim 1 further including time delay means to remove the voltage from the previously nonenergized coils after the rotor has been in said selected position for a predetermined time.

5. The servocontrol system according to claim 1 wherein the electrical dampening control means is a switch member electrically connecting each of said nonenergized induction coils to a reduced voltage source to partially energize said coils.

6. A servocontrol system for positioning a magnetic rotor in any selected one of a number of angularly displaced positions comprising:
- a plurality of induction coils arrangeable about the axis of the rotor to be pulsed consecutively to rotate the rotor;
- selectively operable means to electrically select another position of displacement of the rotor from a previously selected position;
- a pulse generator operable to effect a signal representative of said previously selected position;
- a position control member responsive to said selective means and to said pulse generator and operable to control the number of pulses applied to said induction coils to effect the selected displacement of the rotor; and
- a control member responsive to said position control member and operable to effect energization of all of said coils to stop and hold the rotor in the selected position.

PO-1050
(5/69)

UNITED STATES PATENT OFFICE
CERTIFICATE OF CORRECTION

Patent No. 3,573,589         Dated April 6, 1971

Inventor(s) Jack Beery

It is certified that error appears in the above-identified patent and that said Letters Patent are hereby corrected as shown below:

Correct the spelling of inventor's last name to --Beery--

Col. 1, line 10, patent should read --supplies--.

Col. 3, line 41, patent should read --(A1+A2+A4)--.

Col. 3, line 42, patent should read --(A1+A2+A4)--.

Col. 5, line 21, patent should read --DBFF $\longrightarrow$ DAFF--.

Col. 6, line 22, patent should read --print--.

Signed and sealed this 24th day of August 1971.

(SEAL)
Attest:

EDWARD M. FLETCHER, JR.
Attesting Officer

WILLIAM E. SCHUYLER, JR.
Commissioner of Patents